US012587839B2

(12) United States Patent
Karlsson et al.

(10) Patent No.: US 12,587,839 B2
(45) Date of Patent: Mar. 24, 2026

(54) METHOD, DEVICES AND SYSTEM FOR PERFORMING KEY MANAGEMENT

(71) Applicant: u-blox AG, Thalwil (CH)

(72) Inventors: Peter Karlsson, Malmö (SE); Davide Lenzarini, Thalwil (CH); Hariharasudhan Vigneswaran, Malmö (SE)

(73) Assignee: u-blox AG, Thalwil (CH)

( * ) Notice: Subject to any disclaimer, the term of this patent is extended or adjusted under 35 U.S.C. 154(b) by 260 days.

(21) Appl. No.: 18/187,845

(22) Filed: Mar. 22, 2023

(65) Prior Publication Data

US 2023/0308868 A1      Sep. 28, 2023

(30) Foreign Application Priority Data

Mar. 22, 2022    (EP) ..................................... 22163546

(51) Int. Cl.
*H04W 12/04*      (2021.01)
*H04W 12/03*      (2021.01)
*H04W 12/069*      (2021.01)

(52) U.S. Cl.
CPC ........... *H04W 12/04* (2013.01); *H04W 12/03* (2021.01); *H04W 12/069* (2021.01)

(58) Field of Classification Search
CPC ... H04W 12/04; H04W 12/069; H04W 12/03; H04W 12/033; H04W 12/0431; H04W 12/043; H04L 2209/80; H04L 63/062; H04L 63/065; H04L 63/18; H04L 9/083
USPC ........................................................ 455/410
See application file for complete search history.

(56) References Cited

U.S. PATENT DOCUMENTS

| | | | | |
|---|---|---|---|---|
| 2018/0241726 A1* | 8/2018 | White | .................. | H04L 63/062 |
| 2021/0203491 A1* | 7/2021 | Wei | ...................... | H04W 12/043 |
| 2023/0136693 A1* | 5/2023 | Kunz | .................... | H04W 12/04 |
| | | | | 713/171 |
| 2023/0397007 A1* | 12/2023 | Wifvesson | ............ | H04W 12/37 |
| 2024/0273221 A1* | 8/2024 | Shea | ...................... | G06N 10/00 |

FOREIGN PATENT DOCUMENTS

| | | |
|---|---|---|
| EP | 1434407 | 6/2004 |
| WO | WO 2013068033 | 5/2013 |

OTHER PUBLICATIONS

European Extended Search Report in European Appln. No. 22163546.9, dated Sep. 6, 2022, 9 pages.

* cited by examiner

*Primary Examiner* — Hirdepal Singh
(74) *Attorney, Agent, or Firm* — Fish & Richardson P.C.

(57)      ABSTRACT

The present disclosure relates to a method for performing key management for a plurality of communication devices, each of the plurality of communication devices being configured to perform wireless communication using a first wireless communication technology. The method comprises establishing, by at least one of the plurality of communication devices, a first secure connection with a key management service using a second wireless communication technology. The method further comprises negotiating, by the at least one communication device with the key management service using the first secure connection, first authentication information comprising a first authentication bundle for secure communication and/or data protection on the first wireless communication technology.

17 Claims, 5 Drawing Sheets

METHOD, DEVICES AND SYSTEM FOR PERFORMING KEY MANAGEMENT

CROSS-REFERENCE TO RELATED APPLICATIONS

This application claims priority to European Application No. 22163546.9, filed on Mar. 29, 2022, the contents of which are incorporated herein by reference in their entirety.

TECHNICAL FIELD

This disclosure relates to a method for performing key management. The disclosure further relates to a corresponding communication device, communication infrastructure device, system, computer program, and computer-readable storage medium.

BACKGROUND ART

Cryptographic keys and other authentication information are important tools in communication systems. Keys may be used, for example, for authenticating members of a communication network, such as communication devices, to secure communication between such members of the communication network and/or to protect data exchanged by such members of a communication network, by signing and/or encrypting such data. However, provisioning and managing such keys for the aforementioned members of the communication network can be rather difficult to perform in an efficient and secure way, for instance it may require inefficient user assistance between the provisioner and the communication device like using QR codes, NFC tags, audio and so on. Therefore, it is an object of the present disclosure to improve efficiency and security of key management in a communication network.

SUMMARY OF INVENTION

The above-mentioned object is solved by the subject-matter of the attached independent claims. Further embodiments are disclosed in the attached dependent claims.

According to a first aspect, a method for performing key management for a plurality of communication devices is disclosed. Each of the plurality of communication devices is configured to perform wireless communication using a first wireless communication technology. The method comprises establishing, by at least one of the plurality of communication devices, a first secure connection with a key management service using a second wireless communication technology. The method further comprises negotiating, by the at least one communication device with the key management service using the first secure connection, first authentication information comprising a first authentication bundle for secure communication and/or data protection on the first wireless communication technology.

An advantage of the method according to the first aspect is that different wireless communication technologies are used for negotiating the first authentication information with the key management service and for the communication of the at least one communication device with other communication devices. Thereby, the first authentication information may be provided to the at least one communication device via the first secure connection, wherein an effortless and efficient provisioning is achieved, while at the same time a high security standard is maintained due to the fact that a different communication technology is used for the communication between the communication devices.

The access to the second wireless communication technology, for example an infrastructure-based wireless communication technology, may further be, for example, secured by a service provider using identity and access management based for instance on Extensible Authentication Protocol (EAP) for IEEE communication technologies or based on Subscriber Identity Module (SIM) for 3GPP communication technologies. With other words, the first secure connection for provisioning the first authentication information uses a different wireless communication technology compared to the communication with other devices, for which the first authentication information is used. This avoids the need for an inefficient and complex user assisted out-of-band channel between the provisioner and the communication device.

The plurality of communication devices herein may use the first wireless communication technology to communicate with each other, or with other devices. The establishing of the first secure connection using the second wireless communication technology and the negotiating of the first authentication information may be done according to any kind of mechanisms known in the art, periodically or on demand, for example. One or more of the plurality of communication devices may therewith negotiate its respective first authentication information with the key management service.

The second wireless communication technology may be any wireless communication technology known in the art. The at least one communication device may wirelessly connect, using the second wireless communication technology, to a network device, such as for example a routing device, which then may have a wired connection to the key management service.

The first authentication information comprises a first authentication bundle. The first authentication bundle may be used, by the at least one communication device to which it belongs, for secure communication and/or data protection on the first wireless communication technology. For example, the first authentication bundle may be used to establish secure communication channels on the first wireless communication technology and/or may be used to sign/verify and/or encrypt/decrypt data transmitted using the first wireless communication technology. Moreover, the first authentication bundle may be a personalized or unique security bundle for the respective communication device. The security bundle may, for example, comprise any of: key information, metadata, timing information, and cryptographic certificates.

According to at least one embodiment, the at least one communication device of the plurality of communication devices and the key management service are provisioned with authentication material in a trusted environment. The first secure connection with the key management service is established using the provisioned authentication material using symmetric and/or asymmetric cryptography.

Therewith, an especially secure possibility is provided to establish the first secure connection, via which the first authentication information is negotiated. The authentication material is provisioned in a trusted environment and, hence, a reliable root of trust is ensured.

The authentication material may be, for example, in case of symmetric cryptography, a master secret, which is provisioned to both, the at least one communication device and the key management service. In case of asymmetric cryptography, for example, the authentication material may be key pairs and, optionally, Certificate Authority certificates, which are provisioned to the key management service and the at least one communication device respectively. The authentication material may be unique for each communication device.

For example, the authentication material provided in a trusted environment could be used only for the negotiation of the first authentication information in order to maximize the authentication material's key operational life (also called crypto period). In fact, the authentication material provided in a trusted environment should not be used in general for securing communications on the first wireless communication technologies also because in general, considering the high level of security normally used for that, it could be inefficient to establish secure communications.

According to at least one embodiment, the at least one communication device negotiates the first authentication information periodically or on demand.

Herewith, an efficient negotiation of the first authentication information may be achieved.

According to at least one embodiment, the at least one communication device serves as a gateway between the key management service and at least one further communication device to negotiate second authentication information. The second authentication information negotiated by the at least one further communication device with the key management service comprises a second authentication bundle for secure communication and/or data protection on the first wireless communication technology.

The gateway may communicate with the key management service via the second wireless communication technology, and may communicate with the at least one further communication device via the first wireless communication technology.

A communication device, which serves as a gateway, is arranged to relay messages from the at least one further communication device to the key management service and vice versa. The communication device serving as a gateway may relay such messages without further processing. Alternatively, for example in case the messages need to be processed using different protocols for communication between the gateway communication device and the key management service and communication between the gateway communication device and the at least one further communication device, the gateway communication device may perform such further processing.

To allow negotiation of the second authentication information by the at least one further communication device via the gateway communication device, the gateway communication device may establish or accept a secure connection with the key management service using the second wireless communication technology. This secure connection may be established corresponding to the first secure connection, which also uses the second wireless communication technology. The connection between the gateway communication device and the at least one further communication device can be not authenticated or authenticated using the authentication material provisioned in a trusted environment.

An advantage of using the at least one communication device according to the first aspect as a gateway is that even further communication devices, which cannot connect to the key management service directly, can still profit from the above-described advantages of using different wireless communication technologies for the provisioning of authentication information. For example in a system such as an indoor positioning system, a plurality of communication devices is located in an indoor environment. In such situation, for example, the gateway communication device may be able to establish a connection to the key management service, while further communication devices may not be able due to blocked communication paths. In another example, the further communication devices can have only first wireless technology capabilities and not second wireless technology capabilities. In such scenarios, the further communication devices may use the gateway communication device as a gateway to negotiate their respective second authentication information with the key management service.

For example, the gateway communication device cannot access the second authentication information in plain text. The second authentication information is for example always protected end-to-end between the key management server and the destination further communication device.

According to at least one embodiment, the negotiating, by the at least one communication device, of the first authentication information with the key management service and/or the negotiating, by the at least one further communication device, of the second authentication information with the key management service comprises at least one of the following: provisioning, by the key management service, a first communication and/or authentication key to the at least one communication device and/or a second communication and/or authentication key to the at least one further communication device, decommissioning, by the key management service, a first communication and/or authentication key from the at least one communication device and/or a second communication and/or authentication key from the at least one further communication device, and renewing, by the key management service, a first communication and/or authentication key at the at least one communication device and/or a second communication and/or authentication key at the at least one further communication device.

Herewith, an efficient and secure way is provided to provision, decommission, and update communication keys and/or authentication keys for the at least one and/or the at least one further communication device.

According to at least one embodiment, the method further comprises provisioning, by the key management service via at least one second secure connection using a third communication technology, to at least one communication infrastructure device at least a part of the first authentication information.

The communication infrastructure device may be, for example, any infrastructure device of an infrastructure-based network. For example, in case the network is a positioning network, the communication infrastructure device may be a positioning engine or an anchor point (a device with a well-known fixed position used to infer the relative position of other devices), wherein the at least one communication device may perform positioning protocols by communicating with the communication infrastructure device using its positioning engine capabilities directly or using its relay capabilities to reach a positioning engine. In that case, positioning communication may be efficient and secure, since the corresponding first authentication information, which is required to perform the positioning protocols, is negotiated with the at least one communication device and provisioned to the at least one communication infrastructure device using different wireless communication technologies compared to the performing of the communication between the at least one communication device and the at least one communication infrastructure device, i.e. the exchange of positioning messages in that case.

Moreover, additional security and efficiency is provided in that the key management service may only provision a part of the first authentication information to the communication infrastructure device. In particular, only such authentication information may be shared with the communication infrastructure device, which is required for the communication infrastructure device to perform secure communication with the at least one communication device. For example, in case of asymmetric cryptography, the part of the first authentication information may comprise a public key of the communication device, while a different part of the first authentication information, which is not provisioned to the communication infrastructure device, may comprise a private key of the communication device.

Based on the above method, the communication infrastructure device may register communication devices, which are allowed to participate in a communication network, which uses the first wireless communication technology for communication between its members, based on the at least part of first authentication information received from the key management service.

Additionally, also in this case, as discussed above, the at least one communication device may be used as a gateway for at least one further communication device, to negotiate corresponding second authentication information for the at least one further communication device. In that case, the key management service may then provide via the above-mentioned second secure connection at least a part of the second authentication information. This way, also the at least one further communication device may perform secure communication with the communication infrastructure device or other communication devices, in case it cannot directly access the key management service without a gateway.

According to at least one embodiment, the method further comprises using, by the at least one communication device, the first authentication information to perform secure communication via the first wireless communication technology.

A high level of security of communication via the first wireless communication technology is achieved herewith.

According to at least one embodiment, the first communication technology is a short range communication technology, in particular a wireless ad-hoc network communication technology according to a Bluetooth standard or a ZigBee standard or a Thread network protocol or an IEEE standard, and/or the second communication technology is a long range wireless communication technology, in particular an infrastructure-based wireless communication technology according to a 3GPP or IEEE standard, and/or, the third communication technology is a communication technology according to a 3GPP or IEEE standard.

An advantage of the first communication technology being a short range, in particular a wireless ad-hoc, communication technology is that, in this case, the method according to the first and/or second aspect may be applied to a wireless mesh network or to a hybrid mesh/infrastructure wireless network. The first communication technology may be a communication technology according to a Bluetooth standard or a ZigBee standard or a Thread network protocol. Alternatively, the first communication technology may be a communication technology according to an IEEE standard, for example according to any standard of the IEEE 802 project, for example an IEEE 802.11 standard or an IEEE 802.15 standard. The short range communication technology is, for example, a communication technology with a transmission range of less than 1000 meter, in particular less than 600 meter, in particular less than 200 meter, in particular less than 50 meter.

An advantage of the second communication technology being a long range and, in particular infrastructure based, wireless communication technology according to a 3GPP standard, for example UMTS, GSM, LTE or 5G/NR, or an IEEE standard, for example an IEEE 802.11 standard, is that a safe and efficient solution to remotely provide the respective authentication information is achieved. The second communication technology being a long range wireless communication technology means that it has a longer transmission range than the first communication technology. For example, the second communication technology may be a global communication technology. In particular, the second communication technology may be an infrastructure-based communication technology, for which a communication may be performed via a secure and authenticated channel managed by the infrastructure service provider.

The third communication technology can be a wireless infrastructure-based communication technology, according to a 3GPP standard or an IEEE standard like the IEEE 802.11 standard, or a wired communication technology according to an IEEE standard like the Ethernet IEEE 802.3 standard. For example, in an embodiment the first communication technology can be Bluetooth, the second communication technology can be LTE and third communication technology can be Ethernet. The second and/or third communication technology can be intranet-based according to a 3GPP standard, for example Private LTE or Private 5G, or an IEEE standard, for example an IEEE 802.11 standard.

According to a second aspect, a communication device comprises at least one communication unit and a processing unit. The at least one communication unit is configured to perform communication using a first wireless communication technology. The at least one communication unit is further configured to establish a first secure connection with a key management service using a second wireless communication technology. The processing unit is configured to negotiate, with the key management service using the first secure connection, first authentication information comprising a first authentication bundle for secure communication and/or data protection on the first wireless communication technology.

Embodiments and advantages of the second aspect may correspond to those discussed above with respect to the first aspect.

In the communication device according to the second aspect, the at least one communication unit may be implemented as two separate communication units, one for each communication technology, or may be implemented in a common module, which has two interfaces, one for each communication technology, or in one communication unit.

For example, the at least one communication unit may be only one communication unit of one communication technology, which emulates another communication unit for another communication technology. For example, the one communication unit may be an LTE communication unit, and a Bluetooth communication may be emulated using the LTE hardware. Alternatively, the at least one communication unit may be, for example, an LTE communication unit and a Bluetooth communication unit in a single integrated circuit (IC). Alternatively, the at least one communication unit may be an LTE communication unit in a single IC and a Bluetooth communication unit in a single IC. Both ICs may be implemented on the same module.

According to at least one embodiment, the communication device is further configured to serve as a gateway for negotiation of second authentication information between at least one further communication device and the key management service, wherein the second authentication information negotiated by the at least one further communication device with the key management service comprises a second authentication bundle for secure communication and/or data protection on the first wireless communication technology.

According to a third aspect, a communication infrastructure device comprises a first communication unit, a third communication unit and a processing unit. The first communication unit is configured to perform communication using a first wireless communication technology. The third communication unit is configured to establish a second secure connection with a key management service using a third communication technology. The processing unit is configured to negotiate, with the key management service using the second secure connection, first authentication information comprising a first authentication bundle for secure communication and/or data protection on the first wireless communication technology, and to receive at least a part of first authentication information of at least one communication device, the received first authentication information comprising at least a part of first authentication bundle for secure communication and/or data protection with the at least one communication device on the first wireless communication technology.

Advantages and embodiments of the third aspect correspond, in general, to those discussed with regard to the first and second aspect and are not repeated herein.

The communication infrastructure device may further receive, via a first secure connection with the key management service corresponding to the first secure connection between the at least one communication device and the key management service discussed above, an authentication bundle for the communication infrastructure device itself, corresponding to the first authentication bundle discussed above. Further, for the provisioning of a part of the authentication bundle of other devices, to be able to exchange data with them, the second secure connection may be used. The first and second secure connections performed on the third communication technology can be the same connection to save resources.

According to a fourth aspect, a system comprises a plurality of communication devices, at least one of the plurality of communication devices being a communication device according to the second aspect, and a key management service comprising a security unit and a second communication unit. The second communication unit of the key management service is configured to communicate via a first secure connection with the at least one of the plurality of communication devices using a second wireless communication technology. The security unit is configured to negotiate, with the at least one of the plurality of communication devices using the at least one first secure connection, first authentication information comprising a first authentication bundle for secure communication and/or data protection on the first wireless communication technology. The security unit further comprises a first memory unit which is configured to store at least a part of the first authentication information.

Advantages and embodiments of the fourth aspect correspond, in general, to those discussed with regard to the previous aspects and are not repeated herein.

According to at least one embodiment, the system further comprises a communication infrastructure device according to the third aspect and the key management service further comprises a third communication unit. The third communication unit is configured to communicate via a second secure connection with the communication infrastructure device using a third communication technology. The security unit is further configured to provide at least part of the first authentication information to the at least one communication infrastructure device using the at least one second secure connection.

According to at least one embodiment, the security unit is further configured to negotiate second authentication information with at least one further communication device of the plurality of communication devices by using the at least one communication device as a gateway using the second wireless communication technology. The second authentication information comprises a second authentication bundle for secure communication and/or data protection for the at least one further communication device on the first wireless communication technology. The first memory unit is further configured to store at least a part of the second authentication information.

According to at least one embodiment, the first memory unit is further configured to store a unique identifier of the at least one communication device. The security unit is further configured to determine whether to provision at least a part of the first authentication information to the at least one communication infrastructure device based on the unique identifier.

An advantage hereof is that the key management service may provision to the communication infrastructure device only authentication information of certain communication devices, which are known or registered according to their unique identifier. Herewith, security is further improved.

According to at least one embodiment, the communication device further comprises a second memory unit, which is configured to store authentication material provisioned to the communication device in a trusted environment. The first memory unit of the key management system is further configured to store at least a part of the same authentication material. The at least one communication unit of the communication device is configured to establish the first secure connection with the key management service using the provisioned authentication material for secure communication and/or data protection on the second wireless communication technology using symmetric and/or asymmetric cryptography.

According to a fifth aspect, a computer program comprises instructions, which, when executed by at least one processor, perform the method according to the first aspect.

According to a sixth aspect, a computer-readable storage medium comprises the computer program according to the fifth aspect.

Advantages and embodiments, which are described with respect to any of the above aspects may be applied to any of the other aspects accordingly.

BRIEF DESCRIPTION OF DRAWINGS

The above-mentioned aspects of the disclosure and their embodiments will be explained in more detail in the following with the aid of the drawings. Elements and functional blocks having the same or similar function bear the same reference numerals throughout the drawings. Hence, their description is not necessarily repeated in following drawings.

In the figures.

DESCRIPTION OF EMBODIMENTS

Figure 1:
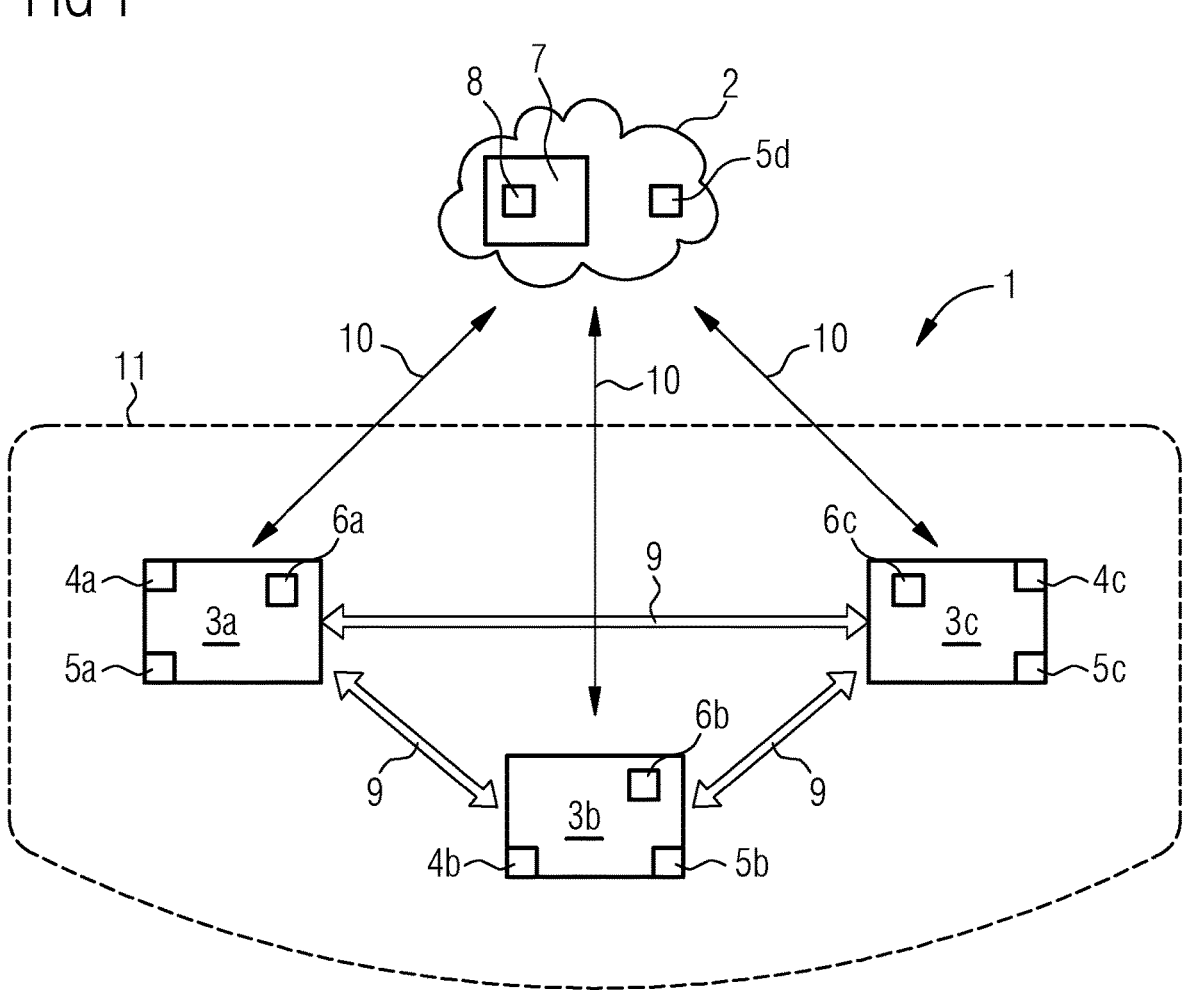
FIG. 1 shows a system according to one embodiment of the disclosure.

FIG. 1 shows a system 1 according to one embodiment of the disclosure. The system 1 comprises a key management service, KMS, 2 and three communication devices 3a, 3b, 3c. Each of the three communication devices 3a, 3b, 3c comprises a first communication unit 4a, 4b, 4c, a second communication unit 5a, 5b, 5c and a processing unit 6a, 6b, 6c. The key management service 2 also comprises a second communication unit 5d and a security unit 7. The security unit 7 comprises a memory unit 8.

The KMS 2, also known as trusted credential management system, is, for example, an internet-based or intranet-based service to provision, decommission and renew communication keys for the communication devices 3a, 3b, 3c.

The communication devices 3a, 3b, 3c are devices of a communication network and are arranged to communicate with each other or, optionally, with at least one master communication device relaying messages to/from the internet or an intranet, not shown herein. In this embodiment, the communication devices 3a, 3b, 3c are part of a mesh system 11, in which the communication devices 3a, 3b, 3c are configured to communicate with each other. The communication devices 3a, 3b, 3c could be tags and/or anchors of a positioning system 11. Additional positioning entities may be present, which are not shown herein. In particular, one of the communication devices 3a, 3b, 3c could be an anchor, the others could be tags. In case of the system 11 being a positioning system, communication devices 3a, 3b, 3c which are tags would, in general, not communicate with each other.

For example, communication device 3a, a tag, can transmit signals protected (signed and/or encrypted) by its authentication information used by communication devices 3c and 3b, as anchors, with an Angle of Arrival (AoA) technology to infer the position of communication device 3a in a trusted way combining the AoA data collected. In another example, the communication device 3a (tag) can listen to signals generated by the anchors 3c and 3b, protected with their authentication information, to infer its own position with an Angle of Departure (AoD) technology in a trusted way. The disclosure, however, is not limited in that regard. In fact, for example, FIG. 1 may also represent the key management for a mesh network in which the nodes, the communication devices 3a and 3b and 3c, exchange any kind of information, protected by the respective first authentication information, using the first wireless technology.

The communication between the communication devices 3a, 3b, 3c uses a first wireless communication technology, communication links of which are shown in FIG. 1 in form of double-lined arrows 9. In case multiple of the communication devices 3a, 3b, 3c are tags, in general, no communication links would be present between those tags, only, for example, between tags and an anchor.

In the embodiment shown herein, the first wireless communication technology is a communication technology according to a Bluetooth standard, for example according to the Bluetooth Low Energy, BLE, standard or according to any Bluetooth 5.X standard. Alternatively, the first wireless communication technology, however, may also be any other kind of wireless communication technology, in particular any kind of short range wireless communication technology.

The first communication units 4a, 4b, 4c of the communication devices 3a, 3b, 3c are arranged to implement the communication using the first wireless communication technology. In the embodiment shown herein, therefore, the first communication units 4a, 4b, 4c are Bluetooth units.

The communication between each of the communication devices 3a, 3b, 3c and the KMS 2 uses a second wireless communication technology, via which respective first secure connections 10 are established. In the embodiment shown herein, the second wireless communication technology is a long range communication technology according to a Global $3^{rd}$ Generation Partnership Project, 3GPP, standard, for example according to the Long Term Evolution, LTE, standard or according to the 5G or New Radio, NR, standard. Alternatively, the second wireless communication technology, however, may also be a communication technology according to an Institute of Electrical and Electronics Engineers, IEEE, standard, for example a Wireless Fidelity, IEEE 802.11 Wi-Fi, standard or any other kind of wireless communication technology.

The second communication units 5a, 5b, 5c, 5d of the communication devices 3a, 3b, 3c and the KMS 2 are arranged to implement the communication using the second wireless communication technology. In the embodiment shown herein, therefore, the second communication units 5a, 5b, 5c, 5d are LTE or 5G/NR units.

Alternatively, in an embodiment not explicitly shown in the figures, the second communication units 5a, 5b, 5c of the communication devices 3a, 3b, 3c may also be different communication units supporting different wireless communication technologies. For example, the communication units 5a and 5b may be Narrow Band-Internet of Things, NB-IoT, units and the communication unit 5c may be a Wi-Fi unit. In that case, the second communication unit 5d of the KMS 2 supports those different second communication technologies, or the KMS 2 comprises multiple second communication units for supporting each of the different second communication technologies.

In the embodiment shown in FIG. 1, each of the communication devices 3a, 3b, 3c is configured to establish a first secure connection 10 with the KMS 2 using the second communication technology. The first secure connection 10 may be established using any kind of asymmetric or symmetric cryptography allowed by the 3a, 3b, 3c and 2 authentication material provided in a trusted environment. The first secure connection 10 may be established using a secure channel of the second wireless communication technology.

Each communication device 3a, 3b, 3c then is configured, with its respective processing unit 6a, 6b, 6c, to negotiate its own first authentication information with the security unit 7 of the KMS 2. The respective first authentication information may comprise communication keys, which may be used by each communication device 3a, 3b, 3c, for example, to perform secure communication with the other communication devices 3a, 3b, 3c using the first wireless communication technology, via communication links 9. Additionally or alternatively, the first authentication information of each communication device 3a, 3b, 3c may also comprise authentication keys, with which each communication device 3a, 3b, 3c may authenticate itself in the communication network consisting of communication devices 3a, 3b, 3c. The KMS 2 may, for each communication device 3a, 3b, 3c, provision and/or decommission and/or renew the respective communication and/or authentication keys.

Further alternatively or additionally, the first authentication information may also be used to provide the communication devices 3a, 3b, 3c with a network time from the second wireless communication network for securing positioning and thereby, for example, improving protection from replay attacks in the communication network of the communication devices 3a, 3b, 3c.

The memory unit 8 of the KMS 2 is configured to store the first authentication information of each communication device 3a, 3b, 3c.

In view of the above, the communication devices 3a, 3b, 3c are arranged to negotiate their respective first authentication information with the KMS 2 using a different communication technology, so called out of band, OOB, compared to the communication technology for which said first authentication information is used. Thereby, the security of the communication links 9 between the communication devices 3a, 3b, 3c using the first communication technology is significantly improved, in particular in case the first wireless communication technology is a wireless ad-hoc communication technology without a service provider enforcing the establishment of secure channels. Since for the OOB authentication information negotiation a long range infrastructure-based wireless communication technology is used, the first authentication information may comfortably be provisioned remotely, which allows a very efficient provisioning of such first authentication information.

Figure 2:
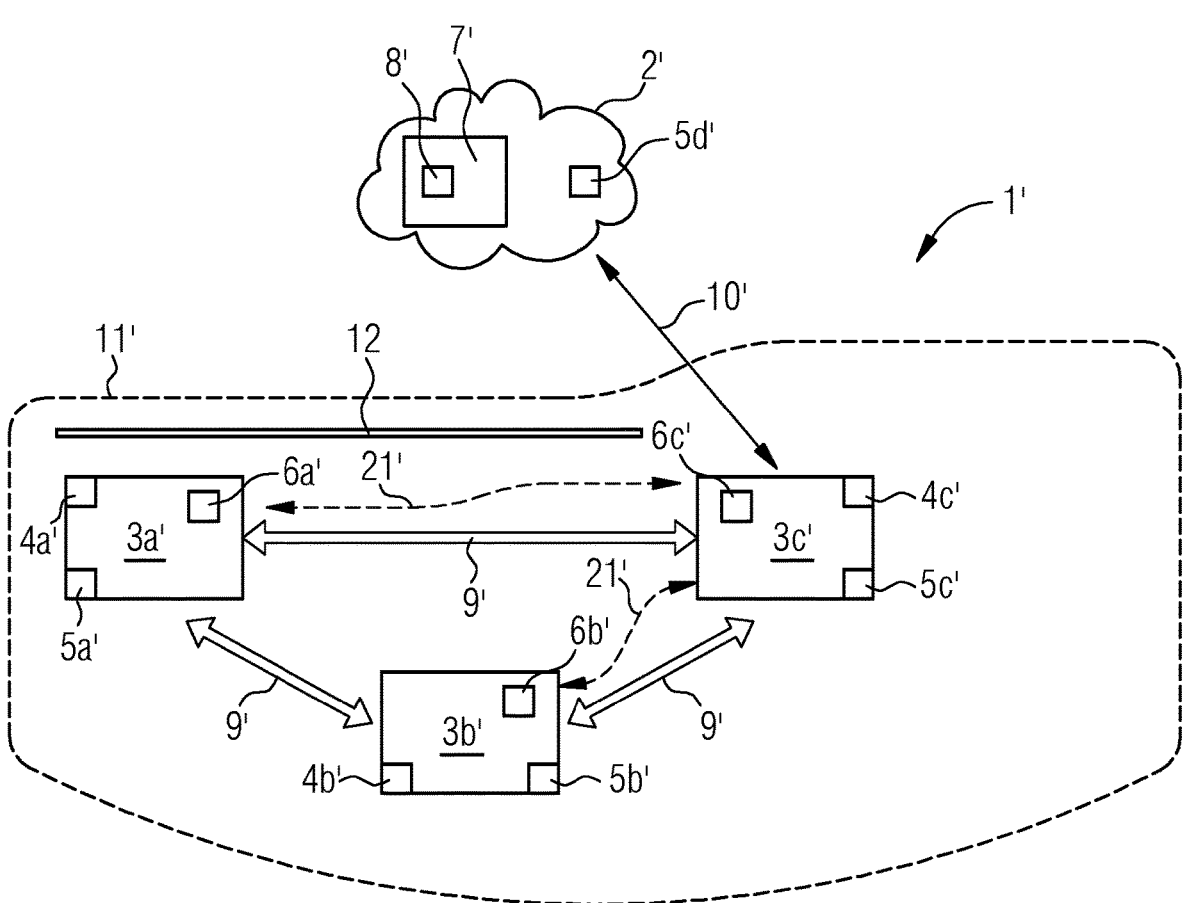
FIG. 2 shows a system according to another embodiment of the disclosure.

FIG. 2 shows a system 1' according to another embodiment of the disclosure. The system 1' comprises all entities of the system 1 as described above with respect to FIG. 1, description thereof is not repeated herein. However, in this case, two of the communication devices 3a' and 3b' are not able to directly communicate with the KMS 2', for example due to a wall 12 blocking direct communication between the KMS 2' and said two communication devices 3a' and 3b' or for example due to lack of availability of the second communication units 5a' and 5b' as not present or not working.

Hence, in the embodiment shown in FIG. 2, the communication devices 3a' and 3b' may use the communication device 3c' as a gateway to negotiate their respective authentication information with the KMS 2'. The communication devices 3a' and 3b' discover that the communication device 3c' is able to reach the KMS 2' so they send their messages to negotiate their respective authentication information with the KMS 2' to the communication device 3c' using the first wireless communication technology, and the communication device 3c' forwards those messages, with or without processing, to the KMS 2' via its first secure connection 10' or another secure connection using the second wireless communication technology.

Communication devices 3a' and 3b' may discover that the communication device 3c' may serve as a gateway using a discovery phase, via which the devices 3a' and 3b' obtain corresponding information from the device 3c', or the devices 3a' and 3b' may use broadcast messages to request information which device can access the KMS 2', to which broadcast messages the device 3c' responds. Analogously, response messages from the KMS 2' to the communication devices 3a' and 3b' are received by the communication device 3c' from the KMS 2' and forwarded to the respective communication devices 3a' and 3b' using the first wireless communication technology.

The messages for negotiating the authentication information with communication devices 3a' and 3b' may be the same messages as sent in system 1 according to FIG. 1 directly from the corresponding communication devices 3a and 3b to the KMS 2.

The connection, illustrated herein with dashed arrows 21', between the communication device 3c' acting as a gateway and the communication devices 3a' and 3b' for provisioning the respective authentication information can be not authenticated or authenticated using authentication material provisioned in a trusted environment. This connection 21' may be established before communication links 9' between all communication devices 3a', 3b', 3c' may be established as discussed with regard to FIG. 1.

Moreover, for example, the communication device 3c' can never access the communication device 3a' and the communication device 3b' authentication information in plain text. In fact, the authentication information may be always protected end-to-end between the KMS 2' and, respectively, the communication device 3a' and communication device 3b'.

In view of the above, the KMS 2' may even negotiate authentication information with communication devices 3a' and 3b', which cannot directly establish a direct connection with the KMS 2' using the second wireless communication technology. This way, respective authentication information may also be negotiated via the gateway device 3c' for simple tags of a communication system 1', which do not comprise the second communication units, and hence could not establish a secure connection to the KMS 2' themselves. Negotiation of the authentication information of the communication device 3c' itself may be performed according to the process described with respect to FIG. 1.

Figure 3:
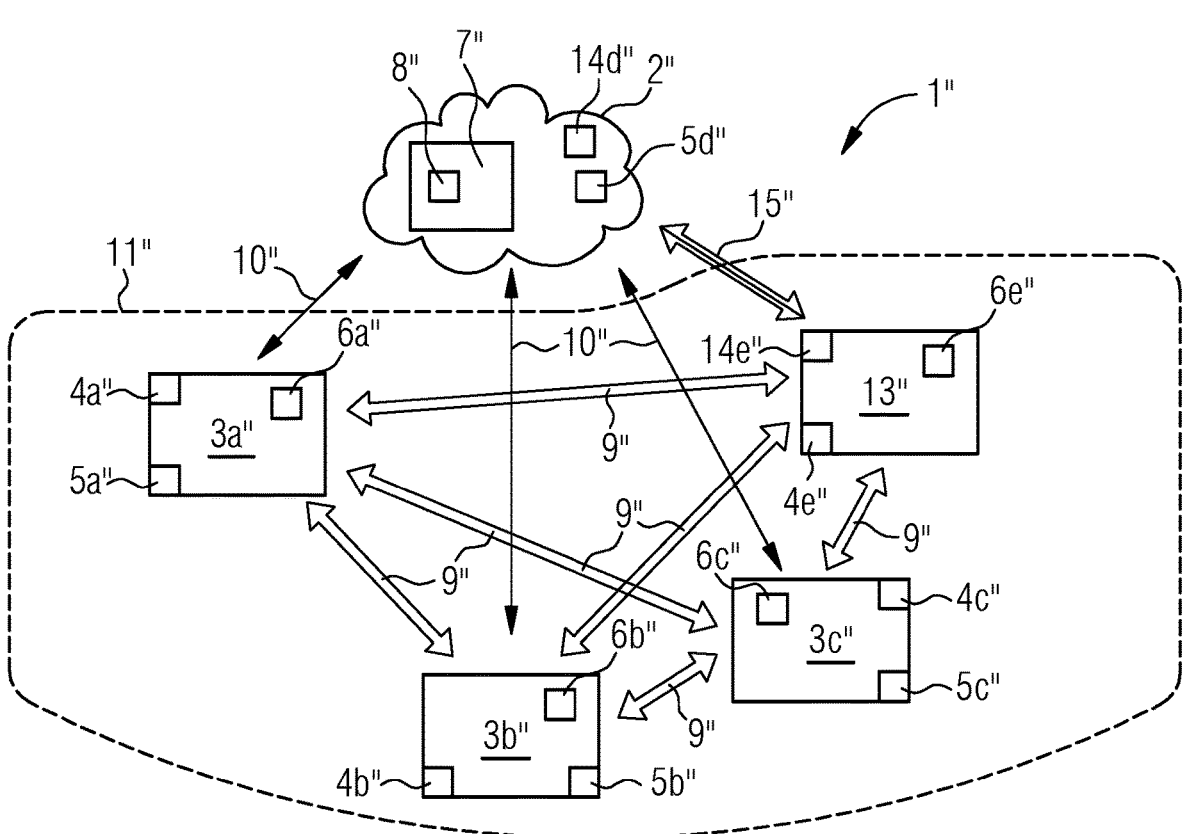
FIG. 3 shows a system according to another embodiment of the disclosure.

FIG. 3 shows a system 1" according to another embodiment of the disclosure. The system 1" comprises all entities of the system 1 as described above with respect to FIG. 1, description thereof is not repeated herein. The communication devices 3a", 3b", 3c" may negotiate their respective authentication information with the KMS 2" via respective first secure connections 10" using the second wireless communication technology.

The communication between the communication devices 3a", 3b", 3c" may be performed on the first wireless communication technology using communication links 9" corresponding to the above-described communication links 9, 9' in FIGS. 1 and 2.

Furthermore, FIG. 3 shows a communication infrastructure device 13". In the embodiment shown herein, where the communication network is a mesh system 11" or positioning system 11", the communication infrastructure device 13" may be a positioning engine of the positioning system 11'. The communication devices 3a", 3b", 3c" could be tags and/or anchors of the positioning system 11". Additional positioning entities may be present, which are not shown herein. In particular, one of the communication devices 3a", 3b", 3c" could be an anchor, the others could be tags. In case of the system 11" being a positioning system, communication devices 3a", 3b", 3c" which are tags would, in general, not have communication links between them. The communication infrastructure device 13", however, may also be an anchor point itself (i.e., a device with a well-known fixed position used to infer the relative position of other devices), wherein the communication devices 3a", 3b", 3c" may perform positioning protocols by communicating with the communication infrastructure device 13" using its positioning engine capabilities directly or using its relay capabilities to reach a positioning engine.

The communication infrastructure device 13" comprises a first communication unit 4e", via which the positioning engine may communicate with the communication devices 3a", 3b", 3c", using the first wireless communication technology.

Furthermore, the communication infrastructure device 13" comprises a third communication unit 14e", via which the communication infrastructure device 13" is configured to communicate using a third communication technology with the KMS 2", via a second secure connection 15". Via said second secure connection 15", the communication infrastructure device 13" is configured to be provisioned with, i.e., negotiate with the KMS 2", first authentication information comprising a first authentication bundle for secure communication and/or data protection on the first wireless communication technology for communication with, for example, the communication devices 3a", 3b", 3c". For said communication, the KMS 2" also comprises a corresponding third communication unit 14d". Moreover, the communication infrastructure device 13" also comprises a processing unit 6e".

The communication infrastructure device 13" is arranged to establish the second secure connection 15" using the third communication technology. The third communication technology may either be a wireless or a wired communication technology, such as any 3GPP or any IEEE based standard, in particular any of the above-mentioned. The third communication technology may either be the same as the second wireless communication technology or may be different from the second wireless communication technology.

In the embodiment shown herein, via the second secure connection, the KMS 2" is arranged to provide at least part of the first authentication information of the communication devices 3a", 3b", 3c" to the communication infrastructure device 13". For example, the KMS 2" may communicate to the communication infrastructure device 13" a unique ID and/or a public key and/or a shared secret of each communication device 3a", 3b", 3c".

The communication infrastructure device 13" is arranged to store the information received from the KMS 2" and to communicate with the communication devices 3a", 3b", 3c", based on this information and its own first authentication information using the first wireless communication technology via communication links 9". For example, the communication infrastructure device 13" may perform positioning protocols to determine and communicate positions of the communication devices 3a", 3b", 3c". The communication infrastructure device 13", hence, may serve as a data collector for the system 1". In fact, for example, FIG. 3 may also represent the key management for a hybrid mesh/ infrastructure network in which the nodes, the communication devices 3a and 3b and 3c, route to the communication infrastructure device 13" any kind of information, protected by the respective first authentication information, using the first wireless technology. In another embodiment, for example, FIG. 3 may represent the key management for an infrastructure network in which the nodes, the communication devices 3a and 3b and 3c, exchange data, protected by the respective first authentication information, using the first wireless technology only with the communication infrastructure device 13".

In the embodiment shown in FIG. 3, each of the communication devices 3a", 3b", 3c" negotiates its own authentication information with the KMS 2" directly.

Alternatively, however, it is also possible that one of the communication devices 3a", 3b", 3c" serves as a gateway as described with reference to FIG. 2.

Alternatively or additionally, it is also possible that the communication infrastructure device 13" serves as a gateway such that one or more of the communication devices 3a", 3b", 3c" may use the communication infrastructure device 13" to negotiate its authentication information with the KMS 2" using the second secure connection 15" or another secure connection between the communication infrastructure device 13" and the KMS 2". In the latter, in other words, the communication infrastructure device 13" serves as a gateway, corresponding to the gateway scenario described with reference to FIG. 2, for relaying the authentication information of the communication devices 3a", 3b", 3c" to the communication devices 3a", 3b", 3c". This may be in particular advantageous in case, for example, none of the communication devices 3a", 3b", 3c" can directly access the KMS 2", for example due to being blocked by a wall such as shown in FIG. 2 for communication devices 3a' and 3b'. Details of the gateway scenario, described with regard to FIG. 2, are not repeated herein.

Figure 4:
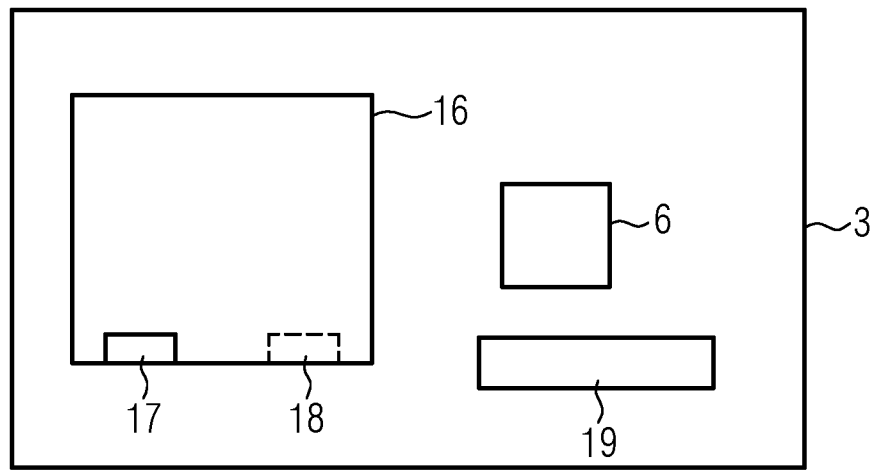
FIG. 4 shows a communication device according to one embodiment of the disclosure.

FIG. 4 shows a communication device 3 according to one embodiment of the disclosure. The communication device 3 may implement the functions of any of the communication devices described with respect to FIGS. 1 to 3.

The communication device 3 according to FIG. 4, however, shows an alternative implementation of the communication units. Instead of two separate communication units as described with respect to FIGS. 1 to 3, the communication device 3 according to FIG. 4 comprises one communication unit 16, which is arranged to communicate using both the first wireless communication technology and the second wireless communication technology described with respect to FIGS. 1 to 3, by emulating a first communication technology, hence a first communication unit, using the communication unit 16. Communication unit 16 operates according to a second communication technology, e.g. according to a 3GPP technology and emulates a first communication technology, e.g. according to BLE.

The communication unit 16 comprises a first interface 17 for the first wireless communication technology. The communication unit 16 may be, for example, an LTE communication unit, which emulates, for example, a Bluetooth Low Energy, BLE, communication unit. Hence, the communication unit 16 is capable of receiving and sending messages according to BLE via the first interface 17. Other communication standards, however, may be implemented accordingly. Optionally, the communication device 16 may also comprise a second interface 18 for the second wireless communication technology, in case not both wireless communication technologies may be accessed via the same first interface 17. Alternatively, the communication device 3 may comprise two dedicated communication units for the first and second wireless communication technology being implemented in a single integrated circuit, or may comprise two dedicated communication units implemented in separate integrated circuits for each wireless communication technology. In another embodiment, the communication device 3 may have a communication unit 16 allowing only the communications via the first wireless technology.

Moreover, the communication device 3 comprises a processing unit 6, which corresponds to the processing units of the communication devices described with respect to FIGS. 1 to 3. The processing unit 6 is arranged to execute instructions to perform the above-described features of the communication devices.

Furthermore, the communication device 3 comprises a memory unit 19. The memory unit 19 is arranged to store any information obtained or processed by the communication device 3. In particular, the memory unit 19 is arranged to store authentication material, for example a unique bit code or any kind of master secret or secret keys of a key pair, which is provisioned to the communication device 3, for example at a time of production, in a trusted environment.

A copy of the authentication material provisioned in a trusted environment is stored at the KMS described with respect to FIGS. 1 to 3. This way, the communication device 3 may use the authentication material to establish the first secure connection with the KMS as described with reference to FIGS. 1 to 3. Alternatively or additionally, the KMS may use the authentication material to identify the communication device 3, e.g. based on a whitelist, which lists trusted communication devices, to acknowledge and identify trusted communication devices once they are deployed.

Figure 5:
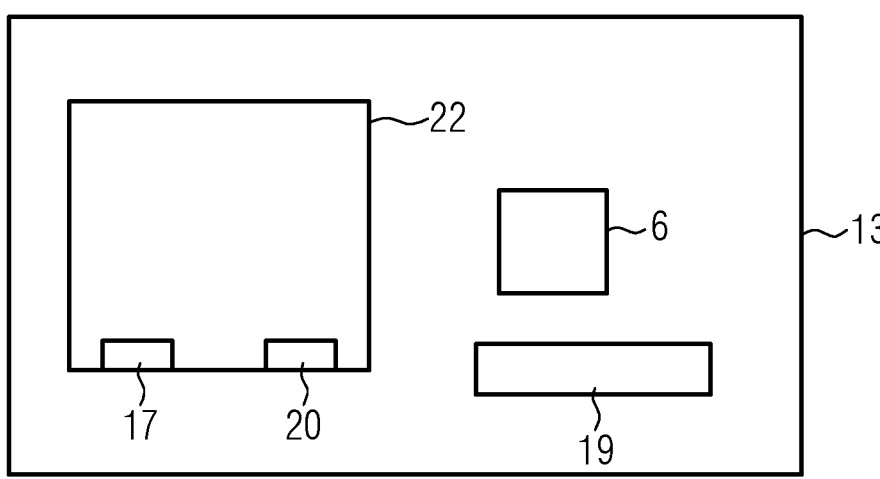
FIG. 5 shows a communication infrastructure device according to one embodiment of the disclosure.

FIG. 5 shows a communication infrastructure device 13 according to one embodiment of the disclosure. The communication infrastructure device 13 may implement the functions of the communication infrastructure device described with respect to FIG. 3.

The communication infrastructure device 13 according to FIG. 5, however, shows an alternative implementation. Instead of two separate communication units as described with respect to FIG. 3, the communication infrastructure device 13 according to FIG. 5 comprises one combined communication unit 22, which is arranged to communicate using both the first wireless communication technology and the third communication technology described with respect to FIG. 3 in a single integrated circuit. The combined communication unit 22 of the communication infrastructure device 13, however, comprises a first interface 17 for the first wireless communication technology and a third interface 20 for the third communication technology. Alternatively, however, also the communication infrastructure device 13 may comprise one communication unit which emulates another communication unit, or may comprise two separate integrated circuits dedicated to the first and third communication technologies, as described above.

Moreover, the communication infrastructure device 13 comprises a processing unit 6, which corresponds to the processing unit of the communication infrastructure device described with respect to FIG. 3. The processing unit 6 is arranged to execute instructions to perform the above-described features of the communication infrastructure device. The communication infrastructure device 13 further comprises a memory unit 19 to store its own authentication material provisioned in a trusted environment and the parts of the authentication information of the communication devices, received from the KMS.

Figure 6:
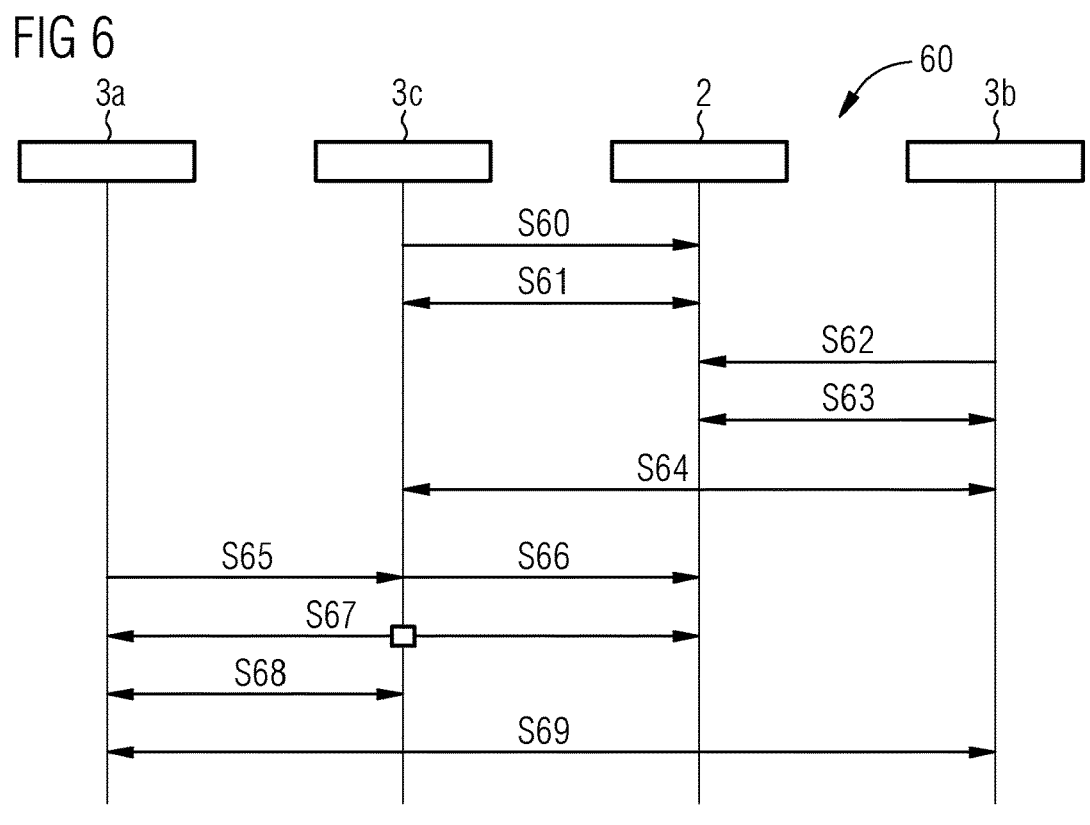
FIG. 6 shows a method for performing key management according to one embodiment of the disclosure.

FIG. 6 shows a method 60 for performing key management according to one embodiment of the disclosure.

The method 60 may be applied to a communication network comprising a plurality of communication devices, each of the plurality of communication devices being configured to perform wireless communication using a first wireless communication technology.

In one step S60, a first communication device 3c establishes a first secure connection with a key management service 2 using a second wireless communication technology.

In another step S61, the first communication device 3c negotiates with the key management service 2 using the first secure connection, first authentication information of the first communication device 3c comprising a first authentication bundle of the first communication device 3c for secure communication and/or data protection on the first wireless communication technology.

In another step S62, a second communication device 3b establishes another first secure connection with the key management service 2 using the second wireless communication technology.

In another step S63, the second communication device 3b negotiates with the key management service 2 using the first secure connection, its own first authentication information of the second communication device 3b comprising a first authentication bundle of the second communication device 3b for secure communication and/or data protection on the first wireless communication technology.

In another step S64, the first and second communication device 3c, 3b may then perform secure communication via the first communication technology using their respective authentication information.

In another step S65, a third communication device 3a sends a request for negotiating authentication information to the first communication device 3c. This may be done, for example, in case the third communication device 3a cannot establish a first secure connection with the KMS 2 using the second wireless communication technology, for example due to blocked communication paths or a lack of a corresponding communication unit for the second wireless communication technology on the third communication device 3a. The third communication device 3a sends the request to the first communication device 3c using the first wireless communication technology. Further details with regard to authentication and encryption of such request have been discussed in detail above with regard to the gateway scenario and are not repeated herein.

In another step S66, the first communication device 3c, which serves as a gateway between the third communication device 3a and the KMS 2, forwards the request to the KMS.

In another step S67, the third communication device 3a negotiates, with the KMS 2, second authentication information, using the first communication device 3c as a gateway. In this context, authentication information is called "first" authentication information, in case a communication device negotiates the authentication information without a gateway and "second" authentication information, in case a communication device negotiates the authentication information with the KMS using another device as gateway.

In further steps S68 and S69, the third communication device 3a may then perform secure communication with the first and second communication device 3a, 3b, each using their respective authentication information.

Figure 7:
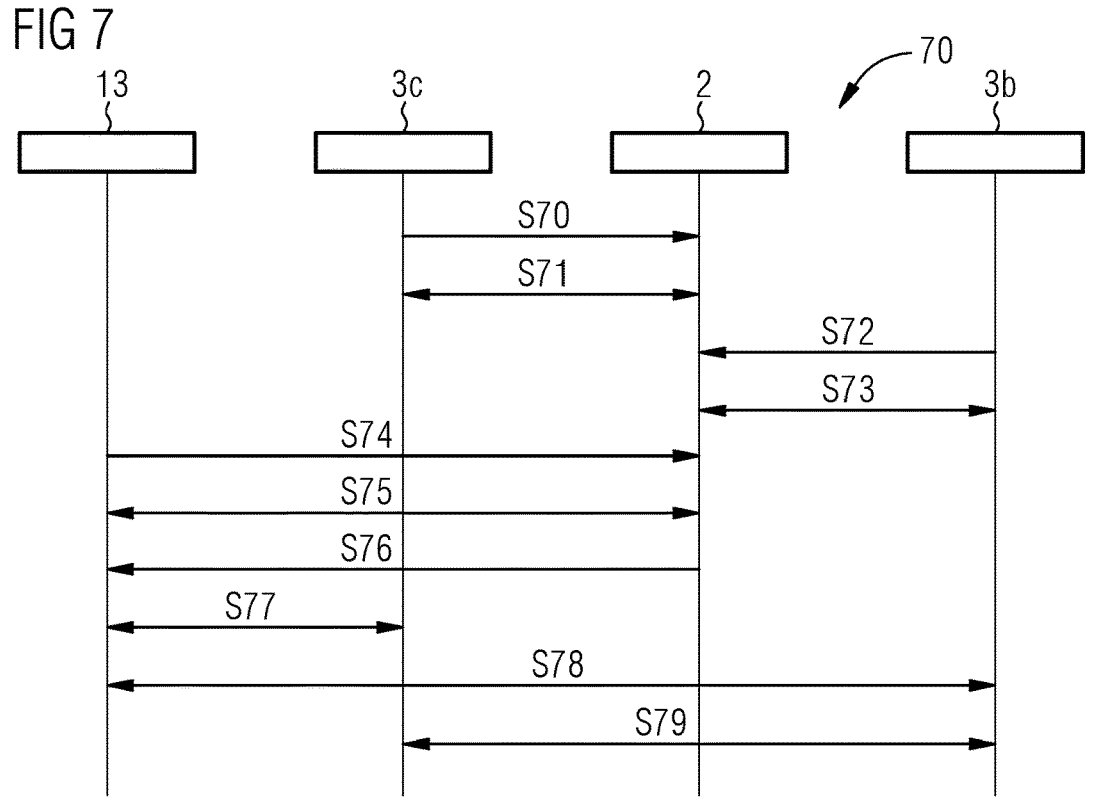
FIG. 7 shows a method for performing key management according to one embodiment of the disclosure.

FIG. 7 shows a method 70 for performing key management according to one embodiment of the disclosure.

The method 70 may be applied to a communication network comprising a plurality of communication devices 3c, 3b and a communication infrastructure device 13, each of the plurality of communication devices 3c, 3b and the communication infrastructure device 13 being configured to perform wireless communication using a first wireless communication technology.

In one step S70, a first communication device 3c establishes a first secure connection with a key management service 2 using a second wireless communication technology.

In another step S71, the first communication device 3c negotiates with the key management service 2 using the first secure connection, first authentication information of the first communication device 3c comprising a first authentication bundle of the first communication device 3c for secure communication and/or data protection on the first wireless communication technology.

In another step S72, a second communication device 3*b* establishes another first secure connection with the key management service 2 using the second wireless communication technology.

In another step S73, the second communication device 3*b* negotiates with the key management service 2 using the first secure connection, its own first authentication information of the second communication device 3*b* comprising a first authentication bundle of the second communication device 3*b* for secure communication and/or data protection on the first wireless communication technology.

In another step S74, the communication infrastructure device 13 establishes a second secure connection, using a third communication technology, with the KMS 2.

In another step S75, the communication infrastructure device 13 negotiates, with the KMS 2, its own authentication information comprising an authentication bundle for secure communication and/or data protection on the first wireless communication technology.

In another step S76, the KMS 2 provides via the second secure connection at least a part of the first authentication information of each of the first and second communication devices 3*c*, 3*b*.

In further steps S77 and S78, the communication infrastructure device 13 may then communicate with the first and second communication devices 3*c*, 3*b*, using the received parts of the respective authentication information. For example, the communication infrastructure device 13 may authenticate the devices 3*c*, 3*b* in the communication system.

In a further step S79, the first and second communication device 3*c*, 3*b*, may perform secure communication using their respective authentication information.

It is to be understood that any features described with regard to one of the above-mentioned embodiments, explained with reference to any of the FIGS. 1 to 7, may correspondingly also be combined with the other embodiments explained with reference to any of the other Figures. For example, a combination of the gateway scenario, as described with reference to FIG. 2, and the communication infrastructure device scenario, as described with reference to FIG. 3, may be achieved. For example, one of the communication devices in the scenario described with reference to FIG. 3 may serve as a gateway, or the system as described with reference to FIG. 2 may comprise a communication infrastructure device. Further, it would also be possible that the communication infrastructure device itself serves as a gateway, corresponding to the gateway as described with respect to FIG. 2.

LIST OF REFERENCE SIGNS 1 system
2 key management service
3 communication device
4 first communication unit
5 second communication unit
6 processing unit
7 security unit
8 memory unit
9 communication link
10 first secure connection
11 mesh or positioning system
12 wall
13 communication infrastructure device
14 third communication unit
15 second secure connection

18

16 combined communication unit
17 first interface
18 second interface
19 memory unit
20 third interface
21 provisioning connection
22 combined communication unit
60, 70 methods
S60-S69 steps
S70-S79 steps

The invention claimed is:

1. A method for performing key management for a plurality of communication devices, each of the plurality of communication devices being configured to perform wireless communication using a first wireless communication technology, the method comprising:
   establishing by at least one communication device of the plurality of communication devices, a first secure connection with a key management service using a second wireless communication technology; and
   negotiating by the at least one communication device with the key management service using the first secure connection, first authentication information comprising a first authentication bundle for secure communication and/or data protection on the first wireless communication technology, wherein the negotiating, by the at least one communication device, of the first authentication information with the key management service comprises
   provisioning, by the key management service, a first authentication key to the at least one communication device, and/or
   renewing, by the key management service, the first authentication key to the at least one communication device, and/or
   decommissioning, by the key management service, the first authentication key from the at least one communication device.

2. The method according to claim 1, wherein:
   the at least one communication device of the plurality of communication devices and the key management service are provisioned with authentication material in a trusted environment;
   the first secure connection with the key management service is established using the provisioned authentication material using symmetric and/or asymmetric cryptography.

3. The method according to claim 1, wherein the at least one communication device serves as a gateway between the key management service and at least one further communication device to negotiate second authentication information, wherein the second authentication information negotiated by the at least one further communication device with the key management service comprises a second authentication bundle for secure communication and/or data protection on the first wireless communication technology.

4. The method according to claim 1, wherein the negotiating, by the at least one communication device, of the first authentication information with the key management service comprises at least one of the following:
   provisioning, by the key management service, a first communication key to the at least one communication device;
   decommissioning, by the key management service, the first communication key from the at least one communication device;

renewing, by the key management service, the first communication key at the at least one communication device.

5. The method according to claim 1, further comprising:
provisioning, by the key management service via at least one second secure connection using a third communication technology, to at least one communication infrastructure device at least a part of the first authentication information.

6. The method according to claim 1, further comprising:
using, by the at least one communication device, the first authentication information to perform secure communication via the first wireless communication technology.

7. The method according to claim 1, wherein the first wireless communication technology is a wireless ad-hoc network communication technology according to a Bluetooth standard or a ZigBee standard or a Thread network protocol or an IEEE standard, and/or the second wireless communication technology is an infrastructure-based wireless communication technology according to a 3GPP or IEEE standard.

8. The method according to claim 4, wherein the negotiating, by the at least one communication device, of the first authentication information with the key management service comprises at least one of the following:
provisioning, by the key management service, a second communication key and/or a second authentication key to at least one further communication device; and/or
decommissioning, by the key management service, the second communication key and/or the second authentication key from the at least one further communication device; and/or
renewing, by the key management service, the second communication key and/or the second authentication key at the at least one further communication device.

9. A communication device comprising at least one communication unit and a processing unit, wherein:
the at least one communication unit is configured to perform communication using a first wireless communication technology;
the at least one communication unit is further configured to establish a first secure connection with a key management service using a second wireless communication technology; and
the processing unit is configured to negotiate, with the key management service using the first secure connection, first authentication information comprising a first authentication bundle for secure communication and/or data protection on the first wireless communication technology,
wherein negotiating the first authentication information comprises
obtaining, from the key management service, a first authentication key for the communication device, and/or
renewing, by the key management service, the first authentication key to the communication device, and/or
decommissioning, by the key management service, the first authentication key from the communication device.

10. The communication device according to claim 9, wherein:
the communication device is further configured to serve as a gateway for negotiation of second authentication information between the at least one further communication device and the key management service, wherein the second authentication information negotiated by the at least one further communication device with the key management service comprises a second authentication bundle for secure communication and/or data protection on the first wireless communication technology.

11. A system comprising:
a plurality of communication devices,
wherein at least one communication device of the plurality of communication devices is the communication device according to claim 8; and
the key management service according to claim 8, wherein the key management service comprising a security unit and a second communication unit, wherein:
the second communication unit of the key management service is configured to communicate via the first secure connection with the at least one of the plurality of communication devices using the second wireless communication technology;
the security unit is configured to negotiate, with the at least one of the plurality of communication devices using the first secure connection, first authentication information comprising the first authentication bundle for secure communication and/or data protection on the first wireless communication technology; and
the security unit further comprises a first memory unit, which is configured to store at least a part of the first authentication information.

12. The system according to claim 11, wherein the system further comprises a communication infrastructure device, wherein the communication infrastructure device comprises a first communication unit, a third communication unit, and a processing unit, wherein:
the first communication unit is configured to perform communication using the first wireless communication technology;
the third communication unit is configured to establish a second secure connection with the key management service using a third communication technology; and
the processing unit is configured to negotiate, with the key management service using the second secure connection, the first authentication information comprising the first authentication bundle for secure communication and/or data protection on the first wireless communication technology, and to receive at least a part of first authentication information of at least one communication device, the part of the first authentication information comprising at least a part of the first authentication bundle for secure communication and/or data protection with the at least one communication device on the first wireless communication technology, and
the key management service further comprises:
a third communication unit configured to communicate via the second secure connection with the communication infrastructure device using the third communication technology; and
the security unit is further configured to provide at least part of the first authentication information to the communication infrastructure device using the second secure connection.

13. The system according to claim 11, wherein:
the security unit is further configured to negotiate second authentication information with at least one further communication device of the plurality of communication devices by using the at least one communication device as a gateway, wherein the second authentication information comprises a second authentication bundle for secure communication and/or data protection for the at least one further communication device on the first wireless communication technology; and the first memory unit is further configured to store at least a part of the second authentication information.

14. The system according to claim 11, wherein:

the first memory unit is further configured to store a unique identifier of the at least one communication device; and the security unit is further configured to determine whether to provision at least a part of the first authentication information to at least one communication infrastructure device based on the unique identifier.

15. The system according to claim 11, wherein:

the at least one communication device further comprises a second memory unit, which is configured to store authentication material provisioned to the at least one communication device in a trusted environment;

the first memory unit of the key management service is further configured to store at least a part of the same authentication material; and the at least one communication unit of the at least one communication device is configured to establish the first secure connection with the key management service using the provisioned authentication material for secure communication and/or data protection on the second wireless communication technology using symmetric and/or asymmetric cryptography.

16. A communication infrastructure device comprising a first communication unit, a third communication unit and a processing unit, wherein:

the first communication unit is configured to perform communication using a first wireless communication technology;

the third communication unit is configured to establish a second secure connection with a key management service using a third communication technology; and the processing unit is configured to negotiate, with the key management service using the second secure connection, first authentication information comprising a first authentication bundle for secure communication and/or data protection on the first wireless communication technology, and to receive at least a part of first authentication information of at least one communication device, the part of the first authentication information comprising at least a part of the first authentication bundle for secure communication and/or data protection with the at least one communication device on the first wireless communication technology, wherein the first authentication information comprises a first authentication key for a first communication device.

17. One or more tangible, non-transitory, computer-readable media storing instructions that, when executed by at least one communication device configured to perform wireless communication using a first wireless communication technology cause the at least one communication device to perform operations comprising:

establishing a first secure connection with a key management service using a second wireless communication technology; and negotiating, with the key management service using the first secure connection, first authentication information comprising a first authentication bundle for secure communication and/or data protection on the first wireless communication technology, wherein the negotiating the first authentication information with the key management service comprises provisioning, by the key management service, a first authentication key to the at least one communication device, and/or renewing, by the key management service, the first authentication key to the at least one communication device, and/or decommissioning, by the key management service, the first authentication key from the at least one communication device.

* * * * *